Feb. 13, 1968
C. R. HEDBERG
3,368,267
DEVICE FOR BREAKING THE CONNECTION BETWEEN
FRICTIONALLY CONNECTED MEMBERS
Filed Oct. 20, 1965
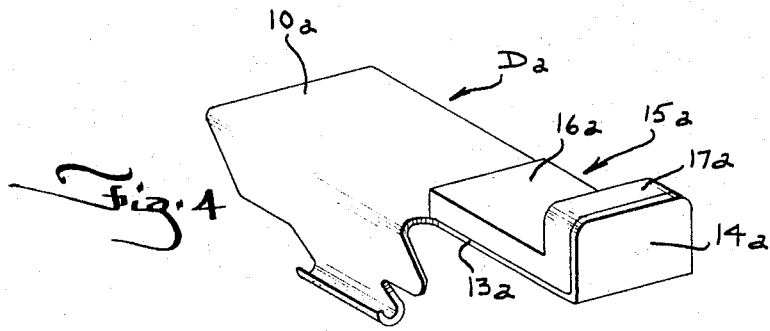
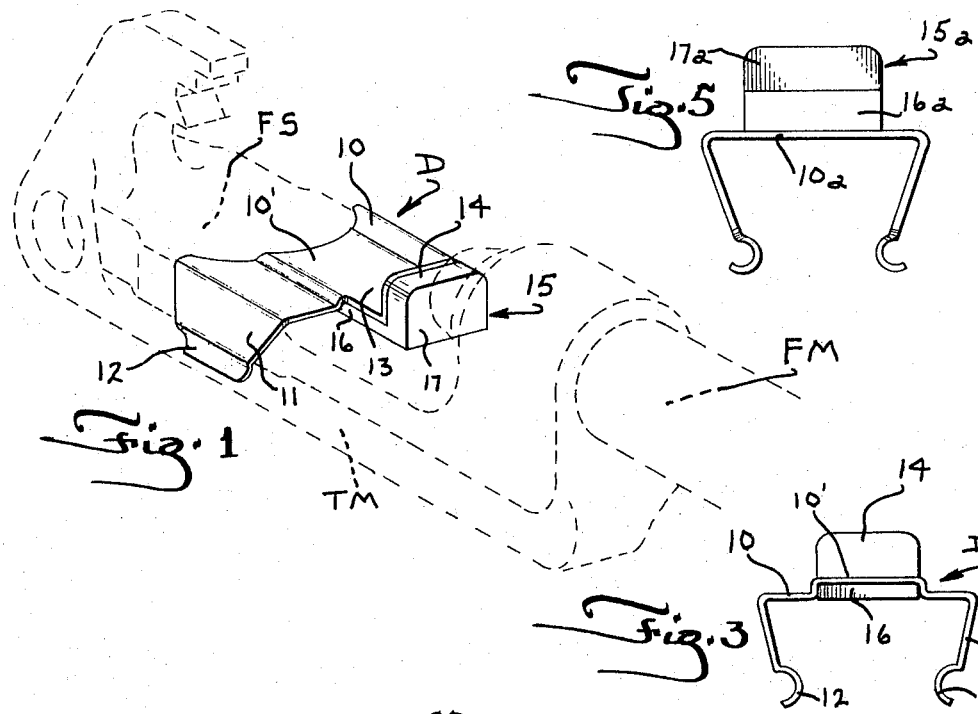
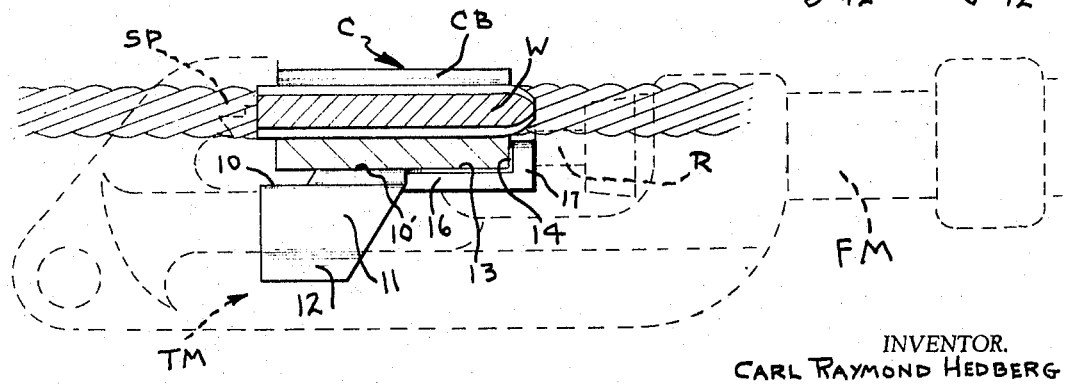
INVENTOR.
CARL RAYMOND HEDBERG
BY Curtis, Morris & Safford

United States Patent Office 3,368,267
Patented Feb. 13, 1968

3,368,267
DEVICE FOR BREAKING THE CONNECTION BETWEEN FRICTIONALLY CONNECTED MEMBERS
Carl Raymond Hedberg, Harrisburg, Pa., assignor to AMP Incorporated, Harrisburg, Pa.
Filed Oct. 20, 1965, Ser. No. 498,602
3 Claims. (Cl. 29—203)

ABSTRACT OF THE DISCLOSURE

A device for disconnecting a frictionally-connected assembly by a tool having a working area including a stationary section and a movable section, the device comprises an assembly-receiving section for movable disposition along the working area and for receiving the frictionally-connected assembly, retaining means extending outwardly from the assembly-receiving section for engagement with the tool adjacent the working area to retain the device in the working area, and an extension extending outwardly from the assembly-receiving section for engaging one element of the frictionally-connected assembly while another element of the frictionally-connected assembly is disposed against the stationary section of the working area of the tool, the movable section of the tool adapted to be engaged with the extension to forcefully move the device and the one element of the frictionally-connected assembly relative to the other element to disconnect the frictionally connected assembly.

---

This invention relates to a device to break the connection between two members, such as, a wedge member in a body member.

In U.S. patent application, Ser. No. 215,562, filed Aug. 8, 1962, now Patent No. 3,212,534 there is disclosed an explosively-operated tool to drive a wedge member into a C-shaped connector body to effect an excellent mechanical and electrical connection between conductor members. Of course, other methods may be used to effect such a connection. After the connection has been effected, it sometimes becomes necessary to break the connection. Since the connection members are so tightly wedged together, it is extremely difficult to disconnect them especially if they have been connected in the manner disclosed in U.S. patent application, Ser. No. 341,223, filed Jan. 30, 1964, now abandoned.

It is, therefore, a primary object of the present invention to provide a device for disconnecting members that have been frictionally connected.

Another object of the present invention is the provision of a tool to disconnect frictionally connected members.

A further object of the present invention is to provide an attachment to be mounted on an existing tool to disconnect frictionally connected members.

An additional object of the present invention is to provide a device operable by an existing tool to disconnect frictionally connected members.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration and principles thereof and the manner of applying them in practical use so that they may modify them in various forms, each as may be best suited to the conditions of a particular use.

The foregoing objects are achieved by means of an attachment or device having spring legs for engagement with a section of an existing tool to maintain the device on the tool. The spring legs are connected together by a portion of the device on which one of the frictionally-connected members is positioned while the other of the frictionally-connected members is disposed against a stationary section of the tool. An extension extends outwardly from the portion of the device to engage the one of the frictionally-connected members and is engaged by a movable section of the tool to forcefully drive the device and the one of the frictionally-connected members relative to the other of the frictionally-connected members.

In the drawing:
FIGURE 1 is a perspective view of a device attachable to an existing tool in phantom;
FIGURE 2 is a side elevational view of FIGURE 1;
FIGURE 3 is a front end view of the device of FIGURE 1;
FIGURE 4 is a perspective view of an embodiment of the invention; and
FIGURE 5 is a front elevational view of the device of FIGURE 4.

Turning now to FIGURES 1 through 3, there is illustrated a device D which is easily inserted on a flat surface FS of an explosively-operated tool member TM disclosed in U.S. Patent No. 3,212,534 and U.S. patent application, Ser. No. 341,223, filed Jan. 30, 1964 wherein a detailed explanation of the operation thereof can be found.

Device D comprises a substantially flat or planar section 10 which bridges spring leg members 11 extending outwardly from the sides of section 10 thereby defining a U-shaped configuration in cross section. The free ends of leg members 11 have arcuate sections 12. Leg members 11 extend in the same direction and toward each other or toward a plane extending through the longitudinal axis of device D. Planar section 10 has a raised portion 10′ and an extension 13 extends outwardly from planar section 10 and has section 14 disposed at right angles with respect to extension 13. A reinforcing member 15 is secured to device D and has an L-shaped configuration including long section 16 disposed within raised section 10′ and extending along the bottom surface of extension 13 and a short section 17 corresponding to the configuration of section 14 of extension 13. As can be discerned, the thickness of short section 17 is greater than that of long section 16 in order to allow a ram R of tool member TM to engage device D without deforming it. Reinforcing member 15 is preferably welded in position.

Tool member TM includes a stepped portion SP against which a wedge W engages when a connection assembly CA is placed within the working area of the tool member along with device D in order to disconnect the wedge from C-shaped connector body CB. Tool member TM includes a firing mechanism FM which carries ram R and is a movable member relative to stationary stepped portion SP.

The operation of FIGURES 1 through 3 is according to the following: Device D is placed on flat surface FS of the tool member with firing mechanism FM being disposed in a rearwardmost position and ram R is completely encased within the firing mechanism. Planar section 10 and long section 16 engage flat surface FS and spring leg members 11 along with arcuate sections 12 resiliently engage the sides of tool member TM underneath flat surface FS to hold the device on the tool member. Connector assembly C having wedge W frictionally engaging connector body CB is placed on device D with connector body CB disposed on raised section 10′ and with wedge W in engagement with stepped portion SP. Section 14 is disposed against the trailing side of connector body CB. Firing mechanism FM is moved to a position adjacent short section 17 and, upon actuation of firing mechanism FM, ram R thereof forcefully engages short section 17 thereby forcefully driving device D and connector body CB relative to wedge W which breaks the connection between the wedge and connector body.

FIGURES 4 and 5 illustrate an embodiment of the present invention wherein device DA has a planar section 10a which does not include a raised section and reinforcing member 15a has long section 16a secured to the top surface of extension 13a and short section 17a is disposed against the front surface of section 14a. Raised section 10' in planar section 10 is present in device D because of the size of the connector assembly C to make sure that wedge W is disposed against stationary portion SP of tool member TM. The embodiment of FIGURES 4 and 5 is used in conjunction with a connector assembly that is larger than the connector assembly to be used in conjunction with device D; otherwise devices D and Da are the same and function in the same manner when used within the working area of tool member TM. Devices D and Da are also preferably used on connections effected in previously mentioned U.S. patent application, Ser. No. 341,223; however, it can be used on connections not using the swaged wedge. Of course, tool member TM can use a movable member other than the firing mechanism and ram to drive devices D and Da to move connector body CB relative to wedge W and the invention is not to be restricted to an explosively-operated tool.

As can be discerned, there has been disclosed a novel device to disconnect connected assemblies which have been connected in such a manner to provide excellent retentive forces therebetween.

It will therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. A device for disconnecting a frictionally-connected assembly by a tool having a working area including a stationary section and a movable section, said device comprising an assembly-receiving section for movable disposition along said working area and for receiving said frictionally-connected assembly, retaining means extending outwardly from said assembly-receiving section for engagement with said tool adjacent said working area to retain said device in said working area, and an extension extending outwardly from said assembly-receiving section for engaging one element of said frictionally-connected assembly while another element of said frictionally-connected assembly is disposed against said stationary section of said working area of said tool, said movable section of said tool adapted to be engaged with said extension to forcefully move said device and the one element of the frictionally-connected assembly relative to the other element to disconnect the frictionally-connected assembly.

2. In a tool according to claim 1 wherein said assembly-receiving section is provided with a raised portion.

3. In a tool according to claim 1 wherein said retaining means comprises spring means.

References Cited

UNITED STATES PATENTS

| | | | |
|---|---|---|---|
| 2,652,054 | 9/1953 | Bishop | 128—214 |
| 2,830,414 | 4/1958 | Sinclair | 53—37 |
| 3,055,399 | 9/1962 | Bush et al. | 138—157 |
| 3,205,567 | 9/1965 | Irvine et al. | 29—203 |
| 3,268,991 | 8/1966 | Beinhaur | 29—427 X |

THOMAS H. EAGER, *Primary Examiner.*